US012739146B2

(12) United States Patent
Theogaraj et al.

(10) Patent No.: US 12,739,146 B2
(45) Date of Patent: Sep. 15, 2026

(54) SOURCE AND RECEIVER ANCHORING FOR EFFICIENT MULTICAST TRAFFIC DISTRIBUTION

(71) Applicant: Hewlett Packard Enterprise Development LP, Spring, TX (US)

(72) Inventors: Isaac Theogaraj, Bangalore (IN); Rajesh B. Mirukula, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 717 days.

(21) Appl. No.: 18/129,675

(22) Filed: Mar. 31, 2023

(65) Prior Publication Data

US 2024/0333546 A1 Oct. 3, 2024

(51) Int. Cl.
*H04L 12/66* (2006.01)
*H04L 12/18* (2006.01)
*H04L 45/00* (2022.01)

(52) U.S. Cl.
CPC ............ *H04L 12/185* (2013.01); *H04L 12/66* (2013.01); *H04L 45/34* (2013.01)

(58) Field of Classification Search
CPC ................................ H04L 45/34; H04L 12/66
USPC .......................................................... 370/390
See application file for complete search history.

(56) References Cited

U.S. PATENT DOCUMENTS 9,509,522 B2 11/2016 Song
9,565,027 B2 2/2017 Yong et al.
9,843,513 B2 12/2017 Nagarajan et al.
10,250,399 B1 * 4/2019 Banerjee ................. H04L 45/16
2012/0075998 A1 * 3/2012 Shah ..................... H04L 12/185 370/237
2021/0314291 A1 * 10/2021 Chandrashekhar ..... H04L 45/44
2021/0328909 A1 10/2021 Dutta et al.

OTHER PUBLICATIONS

Aruba, "AOS-CX 10.3 Multicast Guide," Validated Reference Design Guide, 2019, 53 pages.
Aruba, "AOS-CX Multicast deployment and troubleshooting guide," 2020, 40 pages.

* cited by examiner

*Primary Examiner* — Sibte H Bukhari
(74) *Attorney, Agent, or Firm* — Yao Legal Services, Inc.

(57) ABSTRACT

A system for facilitating efficient multicast traffic distribution in a network comprising a plurality of gateway switches is provided. During operation, the system can receive a join request for a first multicast group. The system can select, based on a source selection mechanism, a first datacenter from a plurality of datacenters as a source of a first multicast flow of the first multicast group. Here, a respective datacenter can provide the first multicast flow. The system can also select, based on a receiver selection mechanism, a first gateway switch from the plurality of gateway switches for receiving the first multicast flow. The system can then send, to the remote gateway switches, a control message comprising information indicating the selection of the source and receiver of the first multicast flow. The control message can notify the first gateway switch to request the first flow from the first datacenter.

20 Claims, 11 Drawing Sheets

SOURCE AND RECEIVER ANCHORING FOR EFFICIENT MULTICAST TRAFFIC DISTRIBUTION

BACKGROUND

Field

The present disclosure relates to communication networks. More specifically, the present disclosure relates to a method and system for efficiently distributing multicast traffic by selecting a source and a receiver gateway switch in a network for a respective multicast group.

BRIEF DESCRIPTION OF THE FIGURES

In the figures, like reference numerals refer to the same figure elements.

DETAILED DESCRIPTION

Figure 1:
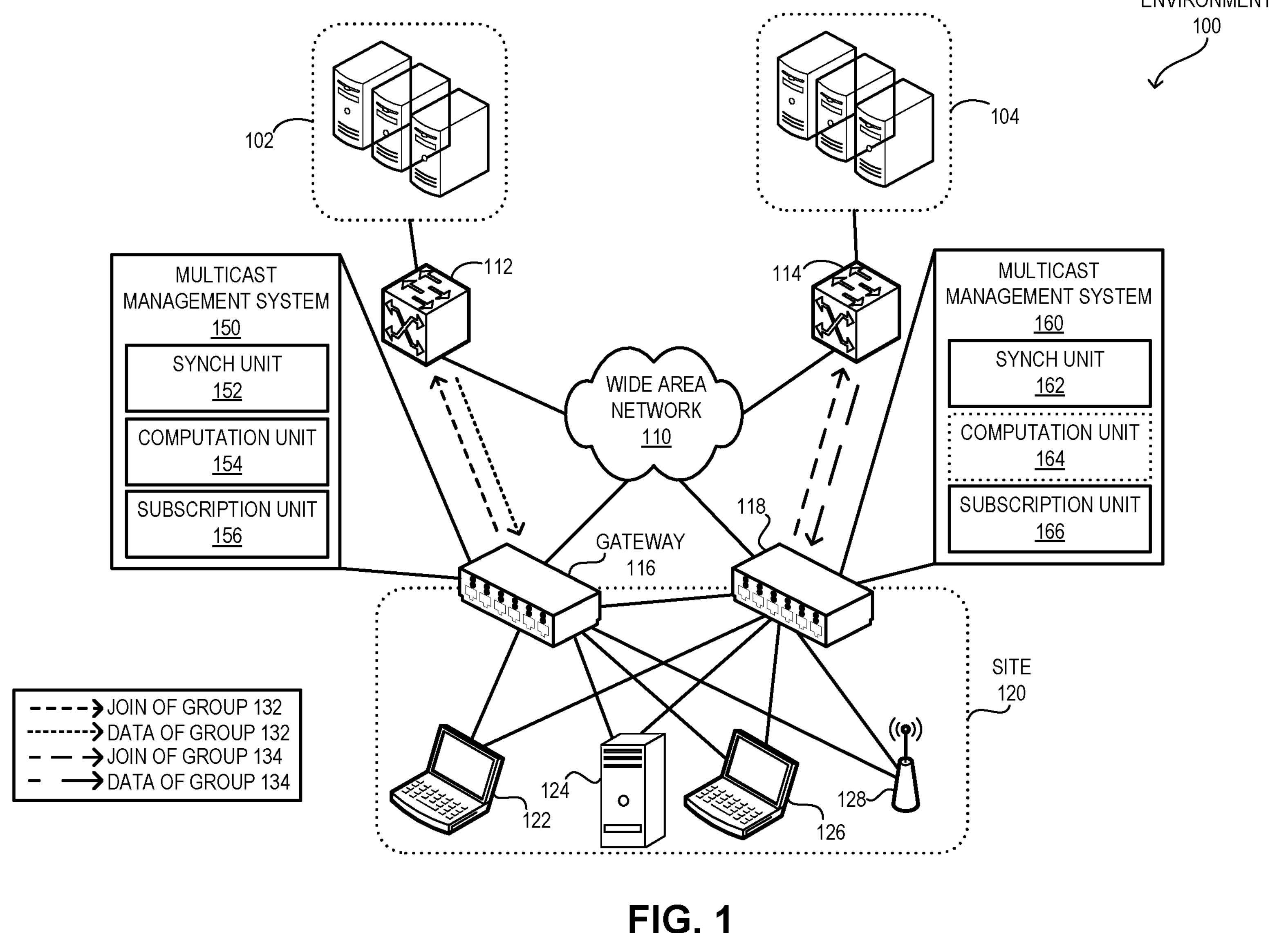
FIG. 1 illustrates an example of a network supporting the efficient distribution of multicast traffic based on source and receiver anchoring, in accordance with an aspect of the present application.

In various Internet applications, multicast is frequently used to distribute content such as video from a source to multiple hosts. Efficient distribution of multicast traffic can improve the performance of a network. A network-layer multicast protocol, such as protocol-independent multicast (PIM) can be used for distributing content in a heterogeneous network. In some scenarios, a host can send a client join request (e.g., an Internet Group Management Protocol (IGMP) join request, or a Multicast Listener Discovery (MLD) join request) to an upstream switch, which can be a gateway switch at a site of an enterprise network.

If the site supports a large number of users, the site may deploy several gateway switches to ensure load balancing and facilitate high availability. To reduce deployment costs, some of the gateway switches might not support PIM. Therefore, when a gateway switch receives a client join request for a multicast group, the gateway switch can forward the client join request toward a switch in communication with a source of the multicast group. In an enterprise network, the source can be multiple datacenters. These datacenters are deployed to provide high availability to each other. Typically, if the multicast flow originates at a different location, the datacenters may first obtain the multicast flow and then re-distribute the flow in the network. Since there can be multiple datacenters providing multicast flows to multiple gateway switches, efficient distribution of multicast traffic can be challenging.

Examples described herein solve the problem of efficiently distributing multicast traffic from multiple sources to requesting switches in a network by (i) selecting an anchor source, which can be a datacenter, and an anchor receiver for a respective multicast group; and (ii) upon the selection of anchors, allowing one multicast flow for the multicast group from the anchor source to the anchor receiver. Among the gateway switches of a site, the anchor receiver can send a join request for the multicast group to the anchor source. As a result, the anchor source can send the multicast flow to the anchor receiver, thereby avoiding redundant multicast flows from other sources to other gateway switches.

With existing technologies, a multicast tree is built based on hosts requesting the multicast data flow for a multicast group and a source providing the flow. Hence, how a multicast data packet should be forwarded may not be known to the switch. As a result, to receive traffic for a multicast group (e.g., via the multicast tree), the switch may send a join request of the multicast group to all available sources. In an enterprise network, many multicast flows (e.g., a presentation, a training session, a speech, etc.) can be provided from multiple datacenters providing high availability to each other. Even if such a multicast flow is originated from an external source, the datacenters may relay the flow in the network, thereby operating as the source within the network.

As a result, a multicast flow of a multicast group can be provided from each of these datacenters. However, basic gateway switches often do not support some high-level capabilities, such as network-level multicast management (e.g., using the PIM protocol). Accordingly, if a gateway switch receives a join request for a multicast group from a host, the switch may forward the join request to each of the datacenters of the network. Even if the PIM protocol is configured on the gateway switch, if a layer-2 network extended via a tunnel, the gateway switch may still forward the join request to each of the datacenters of the network. A respective datacenter, in turn, may send the multicast flow to the gateway switch. Consequently, the gateway switch may receive multiple data flows for the same multicast group (i.e., multiple instances of the same multicast flow) and forward them to the host. Even though the application requesting the multicast flow may be capable of addressing the data duplication, multiple instances of the multicast flow can cause unnecessary resource utilization and congestion in the network.

To solve this problem, for a respective multicast group, one of the gateway switches can send a join request to one of the datacenters. In other words, for the multicast group, one of the datacenters can be selected as a source. Furthermore, if a site of the enterprise network includes multiple gateway switches, one of the gateway switches can be selected as a receiver of the multicast flow for the site. Because only one gateway switch requests traffic from only one datacenter, the network may include one multicast flow from the source datacenter to the gateway switch. The requesting gateway switch and the source datacenter can be referred to as an anchor receiver and an anchor source, respectively, for the multicast group. The anchor source and the anchor receiver can also be referred to as an anchor datacenter and an anchor gateway switch, respectively.

To facilitate the anchor selection process, one of the gateway switches can be elected as a primary switch responsible for the selection decisions. Whenever a gateway switch receives a join request from a host, the gateway switch can send the join request and associated network information (e.g., subscriptions, unicast/multicast bandwidth utilized, and health parameters) to the primary switch. Based on the available information, the primary switch can determine which datacenter should be the anchor source and which gateway switch should be the anchor receiver for the multicast group (i.e., the anchors). The primary switch can then send this information to a respective other gateway switch of the site. Based on the distribution of the information, a respective gateway switch can be aware of the anchors for the multicast group. Upon receiving the information, the gateway switch can store the information in an anchor data structure (ADS) (e.g., a table).

Because the information is distributed, the gateway switch that is selected as the anchor receiver for the multicast group can identify itself. The selected anchor receiver can then send the join request to the anchor source. Based on the join request, the anchor source can send the multicast flow to the anchor receiver, which can then forward the flow to the requesting host. If another gateway switch receives a subsequent join request for the same multicast group from another host, the gateway switch can forward the join request to the anchor receiver. The anchor receiver can then forward the multicast flow to the other requesting host. In this way, for a respective site, a multicast flow can be forwarded from one anchor source (i.e., one datacenter) to one anchor receiver (i.e., one gateway switch).

The primary switch can use a selection mechanism to determine the anchors. The selection mechanism can include an anchor source selection mechanism and an anchor receiver selection mechanism. Each of these selection mechanisms can include a combination of an initial selection process and a policy-based selection process. The initial selection process can be applied when there is not sufficient information available for the policy-based selection process. Therefore, the initial selection process can be applied on the gateway switches or datacenters without additional parameters. For example, if policy-based selection process is based on load on the anchors, the initial selection process can a round-robin policy that can be applied before any load is generated on the anchors by the multicast flows. When a respective gateway switch receives at least one multicast stream, the policy-based selection process can be used to select the anchors. The policy-based selection process can also be based on one or more of: unicast traffic load from the datacenters, access rights, time of day, multicast application type, and user-based policy, which can include, but are not limited to, user location, user type, and user subscription affinity.

When the primary switch receives a join request for a multicast group from a host or another gateway switch, the primary switch can apply the selection mechanism for the multicast group and determine the anchors. On the other hand, instead of running on the primary switch, the selection of the anchors can also be performed in a distributed way at a respective gateway switch. Because the selection mechanism can be based on the same information (e.g., load on the datacenters and gateways), each gateway switch can independently determine the same anchors. A respective gateway switch can then share the independently selected anchors with other gateway switches so that the gateway switches can reconcile the selection. If a conflict is detected by the primary switch where different anchors are selected by different gateway switches, the primary switch's selection can be selected as the resolution. In this way, the anchors are selected for a respective multicast group, thereby ensuring a single multicast flow from the anchor source to the anchor receiver.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z or Compute Express Link (CXL) network, a processor device, or a fabric switch comprising a plurality of similar or heterogeneous smaller physical and/or virtual switches.

A phrase indicating a device, such as "node," "machine," "entity," or "device" may indicate a switch and an end host, such as a user device. The term "message" refers to a group of bits that can be transported together across a network. "Message" should not be interpreted as limiting examples of the present examples to a particular layer of a network. "Message" can be replaced by other terminologies referring to a group of bits, such as "information," "data," "request," "response," "packet," "frame," "cell," "datagram," or "transaction." Furthermore, the term "port" can refer to the port that can receive, store, or transmit data. "Port" can also refer to the hardware, software, and/or firmware logic that can facilitate the operations of that port.

FIG. 1 illustrates an example of a network supporting the efficient distribution of multicast traffic based on source and receiver anchoring, in accordance with an aspect of the present application. An enterprise environment 100 can include a plurality of switches 112, 114, 116, and 118. These switches can be in an enterprise network, which can be an Ethernet, InfiniBand, PCIe, Gen-Z, CXL, or other networks, and may use a corresponding communication protocol, such as Internet Protocol (IP), FibreChannel over Ethernet (FCoE), or other protocol. The enterprise network can span via a wide-area network 110. Datacenters 102 and 104 of enterprise environment 100 can be coupled to switches 112 and 114, respectively. Here, datacenters 102 and 104 can provide high availability (e.g., failover) to each other by taking over the operation of an unavailable datacenter. Enterprise environment 100 can include a site 120 (e.g., an office of the enterprise) that can include end devices (or user devices) 122, 124, 126, and 128. Here, site 120 can include a network that can facilitate connectivity to the devices of site 120.

Switches 116 and 118 can be the gateway switches for site 120. Switches 116 and 118 can be coupled to each other via one or more inter-switch links. Switches 116 and 118 can also be coupled to switches 112 and 114 via respective tunnels through network 110. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A virtual private network (VPN), such as an Ethernet VPN (EVPN), can be deployed over network 110. Because switches 116 and 118 are gateway switches for site 120, end devices in site 120 can reach network 110 and hence, datacenters 102 and 104, via switches 116 and 118.

An end device requesting a multicast data flow (or multicast flow) can be referred to as a host. On the other hand, an end device transmitting the multicast flow can be referred to as a source. In environment 100, many multicast flows can be provided from datacenters 102 and 104. Even if such a multicast flow is originated from an external source, datacenters 102 and 104 may relay the flow in environment 100, thereby operating as the source within environment 100. For example, if end device 112 requests a multicast flow of a multicast group 132 and receives it from datacenter 102, end device 112 and datacenter 102 can be a host and the source of the multicast group. With existing technologies, a multicast tree for multicast group 132 can be built based on host 112 requesting the multicast flow and datacenter 102 providing the flow. Hence, how a multicast data packet should be forwarded may not be known to switch 116 (or switch 118).

As a result, to receive traffic for the multicast group, switch 116 can forward a join request of multicast group 132 to datacenters 102 and 104. Even if the PIM protocol is configured on switch 116, if a layer-2 network extended via tunnels (e.g., to switches 112 and 114), switch 116 may still forward the join request to datacenters 102 and 104. Since both datacenters 102 and 104 can provide the multicast flow for multicast flow 132, the same multicast flow of multicast group 132 can be forwarded to switch 116 from datacenters 102 and 104. Datacenters 102 and 104, in turn, may send the multicast flow to switch 116. Consequently, switch 116 may receive multiple data flows for the same multicast group 132 (i.e., multiple instances of the same multicast flow) and forward them to host 112. Even though the application requesting the multicast flow on host 112 may be capable of addressing the data duplication, multiple instances of the multicast flow in environment 100 can cause unnecessary resource utilization and congestion.

To solve this problem, each of gateway switches 116 and 118 can run respective instances of a multicast management system that can select the anchors for multicast groups. For example, switches 116 and 116 can run multicast management systems 150 and 160, respectively. Systems 150 and 160 can be deployed based on software, hardware, or a combination thereof. Systems 150 and 160 can include synchronization units 152 and 162, respectively, that can synchronize selection information, such as the selection of anchors for a respective multicast group, between switches 116 and 118. Synchronization units 152 and 162 can also determine the primary switch of site 120. For example, each of synchronization units 152 and 162 can perform an election process to determine the primary switch. The election process can be based on a pre-configuration or a distributed selection process (e.g., network-address-based selection).

Systems 150 and 160 can also include subscription units 156 and 166, respectively, that can send a join request toward one of the datacenters 102 and 104 when the anchors are selected for a multicast group. Systems 150 and 160 can select one of gateway switches 116 and 118 to send the join request to one of datacenters 102 and 104. Hence, one of datacenters 102 and 104 can be selected as the source for site 120. Because only one gateway switch requests traffic from only one datacenter, site 120 may receive one multicast flow via network 110.

To facilitate the anchor selection process, a gateway switch, such as switch 116, can be elected as a primary switch responsible for the selection decisions. System 150 on switch 116 can then include a computation unit 154. During operation, switch 118 can receive a join request for multicast group 132 from a host. Synchronization unit 162 can then send the join request and associated network information (e.g., subscriptions, unicast/multicast bandwidth utilized, and health parameters) to switch 116. Based on the available information, computation unit 154 can determine that datacenter 102 should be the anchor source and switch 116 should be the anchor receiver for multicast group 132. Synchronization unit 152 can then send this selection information to a respective other gateway switch, such as switch 118, of site 120. Based on the distribution of the information, a respective gateway switch can be aware of the anchors for multicast group 132.

Because the selection information is distributed, switches 116 and 118 can store the selection information in the respective ADS instances. Subscription unit 154 can then send the join request to datacenter 102 via network 110. Datacenter 102 can then receive the join request via switch 112. Based on the join request, datacenter 102 can send the multicast data flow for multicast group 132 to switch 116 via network 110. Switch 116 can then forward the multicast flow to the requesting host. Similarly, if switch 116 receives a join request for multicast group 134, computation unit 154 can determine that datacenter 104 should be the anchor source and switch 118 should be the anchor receiver for multicast group 134.

Synchronization unit 152 can then send this selection information to switch 118. System 160 can receive the information at switch 118 and store the received information in the local ADS. Furthermore, based on the distribution of the information, system 160 can determine that switch 118 has been selected as the anchor receiver. Subscription unit 166 can then send the join request to datacenter 102, which in turn, can send the multicast data flow to switch 118. In this way, a multicast flow can be forwarded from one anchor source to one anchor receiver of site 120.

Computation unit 154 can use a selection mechanism to determine the anchors. The selection mechanism can include an anchor source selection mechanism and an anchor receiver selection mechanism. For each of the selection mechanisms, computation unit 154 may initially use a round-robin selection process to select the anchors. Therefore, computation unit 154 can apply the initial selection process on gateway switches 116 and 118, or datacenters 102 and 104, without additional parameters. When switches 116 and 118 start receiving multicast flows, computation unit 154 can switch to a policy-based selection process. The policy-based selection process can be based on a set of policy parameters comprising local information associated with switch 116 and obtained information periodically received from switch 118. The policy parameters can include one or more of: multicast traffic load, unicast traffic load, access rights, time of day, multicast application type, and user-based policy, which can include, but are not limited to, user location, user type, and user subscription affinity. If computation unit 154 is applying the anchor receiver selection mechanism, the parameters can correspond to gateway switches 116 and 118. On the other hand, if computation unit 154 is applying the anchor source selection mechanism, the parameters can correspond to datacenters 102 and 104.

Instead of running on switch 116, the selection of the anchors can also be performed in a distributed way on switches 116 and 118. System 160 can then include a computation unit 164 that can also apply the selection mechanism. Synchronization units 152 and 162 can share the selection information with each other. If a conflict is detected by system 150 based on the shared information, the selection by computation unit 154 can be selected as the resolution. Under such a circumstance, system 150 can send a control message to system 160 indicating that a conflict resolution is needed based on the selection performed by computation unit 154. Accordingly, computation unit 164 can replace the local selection with the selection performed by computation unit 154

Figure 2A:
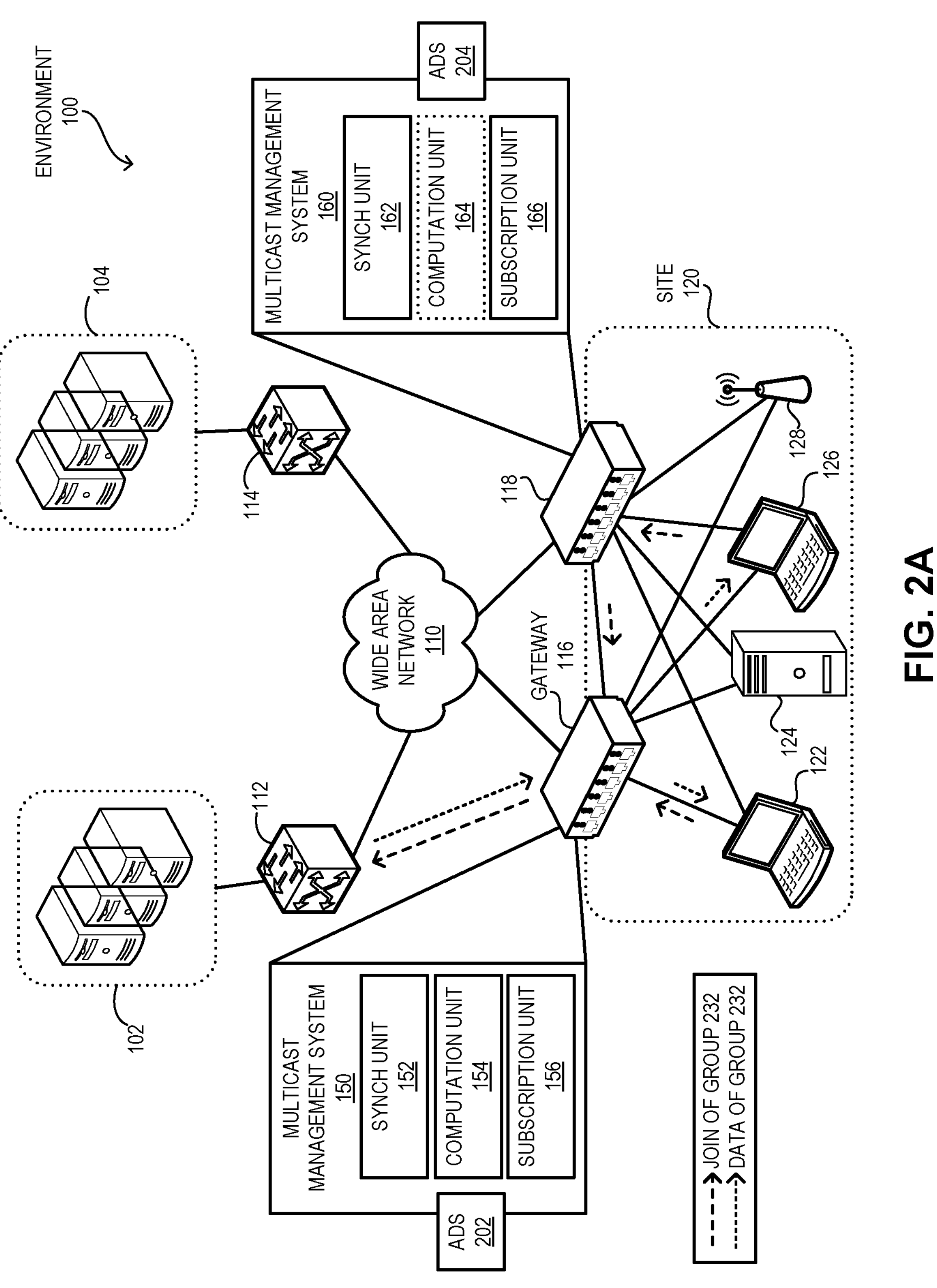
FIG. 2A illustrates an example of using an anchor source and an anchor receiver for distributing multicast traffic, in accordance with an aspect of the present application.

FIG. 2A illustrates an example of using an anchor source and an anchor receiver for distributing multicast traffic, in accordance with an aspect of the present application. During operation, switch 116 can receive a join request for a multicast group 232 from host 122. Since switch 116 is the primary switch, system 150 can look up the multicast address of multicast group 232 in local ADS 202 of system 150. If the looking up operation does not result in a match, computation unit 154 can apply a selection mechanism for selecting the anchors for multicast group 232. To do so, computation unit 154 can first determine whether to apply the initial selection process or the policy-based selection process based on the current load on switches 116 and 118. The load can indicate the multicast and/or unicast traffic volume on switches 116 and 118. If the load on an individual switch is below a threshold, computation unit 154 can select the anchors for multicast group 232 based on round-robin selection. The threshold can be indicated by a predefined value.

Computation unit 154 can apply the round-robin selection process on switches 116 and 118 to select the anchor receiver (i.e., the anchor gateway switch). Computation unit 154 can also apply the round-robin selection process on datacenters 102 and 104 to select the anchor source. On the other hand, if the load is above the threshold, computation unit 154 can determine the anchors by applying a policy-based selection using one or more parameters. For example, if the parameter is load, computation unit 154 can compare the load, which can include the traffic volume of multicast and/or unicast traffic, on switches 116 and 118 to select the anchor receiver. Computation unit 154 can also compare the respective traffic volume from datacenters 102 and 104 to site 120 to select the anchor source.

Suppose that computation unit 154 can determine switch 116 and datacenters 102 as the anchors for multicast group 232 by applying the selection mechanism. Synchronization unit 152 can then send this selection information to switch 118. Based on the distribution of the information, a respective gateway switch can be aware of the anchors for multicast group 232. Accordingly, systems 150 and 160 can store the selection information in ADS 202 and 204, respectively. A respective entry of an ADS can map the multicast address of multicast group 232 to switch 116 and datacenter 102. Switch 116 can be represented in the entry by one or more network addresses, such as the media access control (MAC) address and the Internet Protocol (IP) address of switch 116. Datacenter 102 can be represented by one or more of: a datacenter identifier that uniquely identifies datacenter 102 in the enterprise, an IP address associated with datacenter 102, and a combination thereof. This IP address can be allocated to a source server (e.g., a streaming server) of datacenter 102.

Subscription unit 154 can then send the join request to datacenter 102 via network 110. Datacenter 102 can then receive the join request via switch 112. Based on the join request, datacenter 102 can send the multicast data flow for multicast group 232 to switch 116 via network 110. Switch 116 can then forward the multicast flow to host 122. If switch 118 receives a subsequent join request for multicast group 232 from another host 126, system 160 can look up the multicast address of multicast group 232 in ADS 204 and identify the anchor source as switch 116. Switch 118 can then forward the join request to switch 116. Upon receiving the join request, switch 116 can add host 126 to the outgoing list and start forwarding the multicast flow to host 126. In this way, even if there are multiple hosts sending join requests to different gateway switches, for site 120, the multicast flow associated with multicast group 232 can be forwarded from one anchor source, which can be datacenter 102, to one anchor receiver, which can be switch 116.

The primary switch can use a selection mechanism to determine the anchors. The selection mechanism can include a combination of an initial selection process and a policy-based selection process. The initial selection process can be applied when there is not sufficient information available for the policy-based selection process. For example, if policy-based selection process is based on load on the anchors, the initial selection process can a round-robin policy that can be applied before any load is generated on the anchors by the multicast flows. When a respective gateway switch receives at least one multicast stream, the policy-based selection process can be used to select the anchors. The policy-based selection process can also include one or more of: unicast traffic load from the datacenters, access rights, time of day, multicast application type, and user-based policy, which can include, but are not limited to, user location, user type, and user subscription affinity.

Figure 2B:
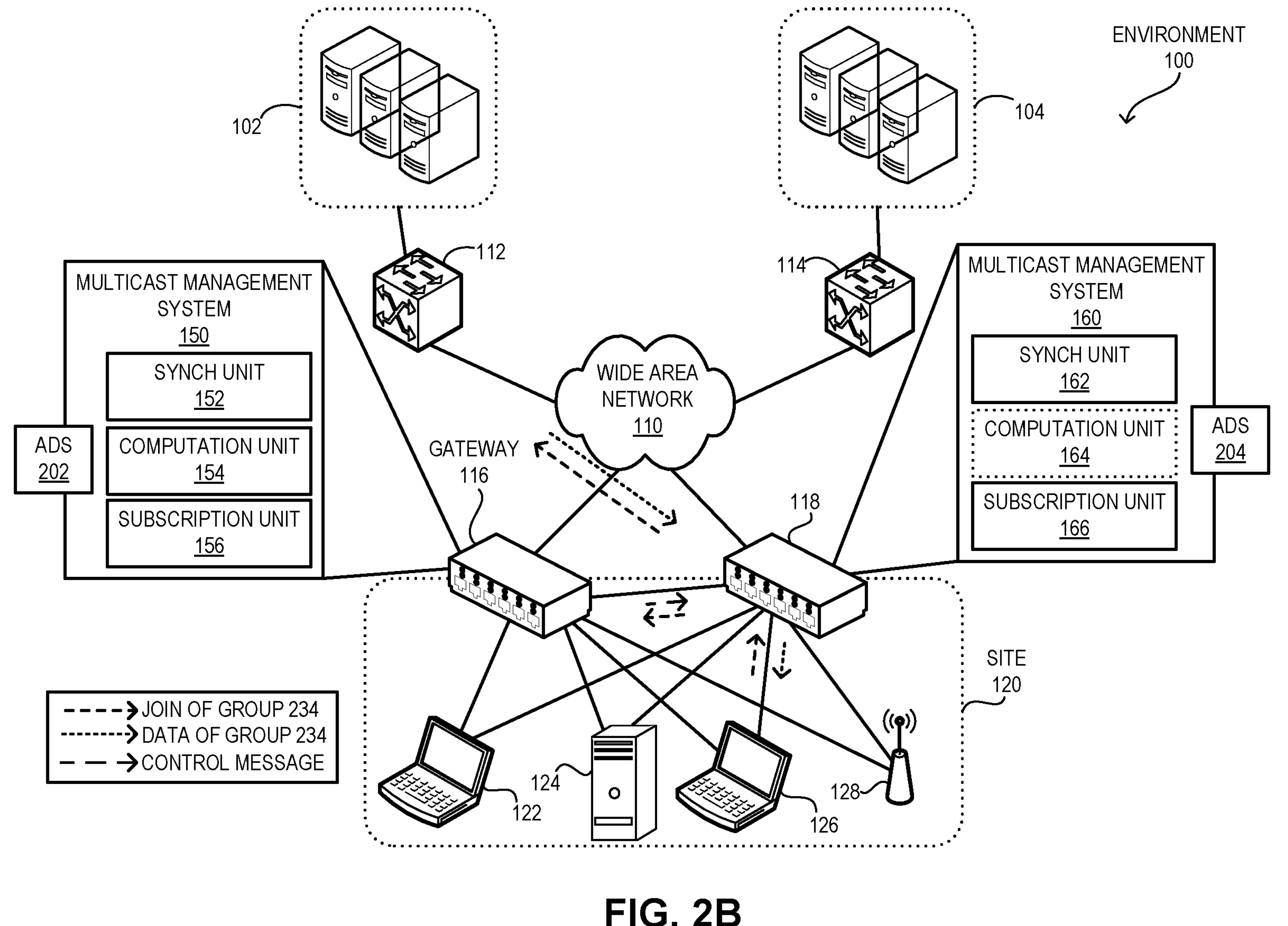
FIG. 2B illustrates an example of a primary gateway switch selecting a remote anchor source for distributing multicast traffic, in accordance with an aspect of the present application.

FIG. 2B illustrates an example of a primary gateway switch selecting a remote anchor source for distributing multicast traffic, in accordance with an aspect of the present application. If switch 118 receives a join request for a multicast group 234 from host 126, synchronization unit 162 can send the join request and associated network information (e.g., subscriptions, unicast/multicast bandwidth utilized, and health parameters) to switch 116. Based on the information, computation unit 154 can determine that datacenter 102 should be the anchor source and switch 118 should be the anchor receiver for multicast group 234. Synchronization unit 152 can then send this selection information to switch 118 via a control message. Synchronization unit 162 can receive the control message and obtain the selection information. System 160 can then store the information indicating the anchors in an entry in ADS 204.

From the selection information received from switch 116, system 160 can also determine that the local switch 118 has been selected as the anchor receiver for multicast group 234. Accordingly, subscription unit 166 can send a join request to datacenter 102 via network 110. Datacenter 102 can then receive the join request via switch 112. Based on the join request, datacenter 102 can send the multicast data flow for multicast group 234 to switch 118 via network 110. Switch 118 can then forward the multicast flow to host 126. In this way, switch 116 can select another gateway switch 118 of site 120 as the anchor receiver, which can then obtain the multicast flow from the anchor source.

Figure 3A:
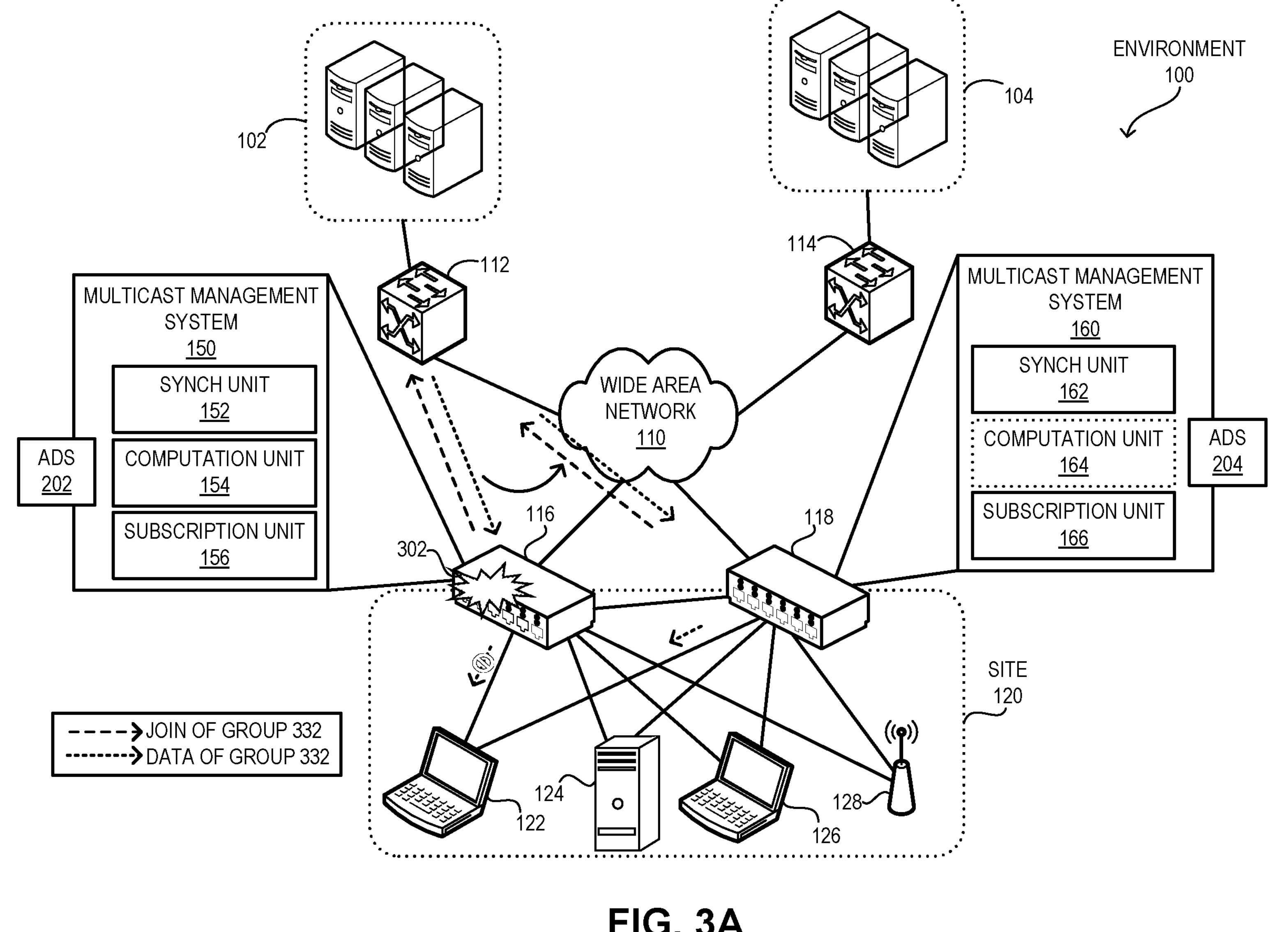
FIG. 3A illustrates an example of a gateway switch facilitating high availability in response to the unavailability of a remote gateway switch, in accordance with an aspect of the present application.

FIG. 3A illustrates an example of a gateway switch facilitating high availability in response to the unavailability of a remote gateway switch, in accordance with an aspect of the present application. For a multicast group 332, switch 116 can be the anchor receiver and datacenter 102 can be the anchor source. Host 122 can be a subscriber of the multicast flow of multicast group 332. Hence, upon receiving the multicast flow from datacenter 102, switch 116 can forward the multicast flow to host 122. Suppose that switch 116 becomes unavailable due to an event 302. Examples of event 302 can include, but are not limited to, a link failure, a node failure, a predetermined unavailability (e.g., an upgrade), a deadlocked buffer, and a congestion level above a threshold (e.g., indicated by a buffer overflow). Because of event 302, switch 116 may no longer operate as the anchor subscriber for site 120 and may not be able to forward multicast flow to host 122.

Switch 118 can detect the unavailability of switch 116 using a detection mechanism. The detection mechanism can be based on the exchange of periodic alive or heartbeat messages. If switch 118 does not receive the message for a predetermined number of times from switch 116, switch 118 can determine that switch 116 is unavailable. System 160 can then identify the next primary switch. If there are no other gateway switches at site 120, system 160 can determine that switch 118 is the next primary switch. Accordingly, system 160 can traverse ADS 204 to determine the multicast groups for which switch 116 is the anchor receiver. For example, system 160 can determine from ADS 204 that switch 116 and datacenter 102 are the anchor receiver and the anchor source for multicast group 332. Since the current anchor receiver is unavailable for multicast group 332, system 160 can determine that switch 116 needs to take over as the anchor receiver.

System 160 can then update ADS 204 to indicate that switch 116 is the anchor receiver. Subscription unit 166 can then send a join request for multicast group 332 to datacenter 102, receive the multicast flow, and forward the multicast flow to host 122. Because switch 116 is unavailable, the data flow from switch 112 may stop based on the network protocols of network 110. When switch 116 recovers from event 302 and becomes available, system 150 can obtain ADS 204, obtain the selection information for a respective multicast group, and regenerate ADS 202 based on the obtained information. At that time, switch 116 may not be the anchor receiver for any multicast flow. Since the load on switch 116 can be low, computation unit 154 may select switch 116 as the anchor receiver for subsequent join requests for unassigned multicast groups until the load is balanced with switch 118.

Figure 3B:
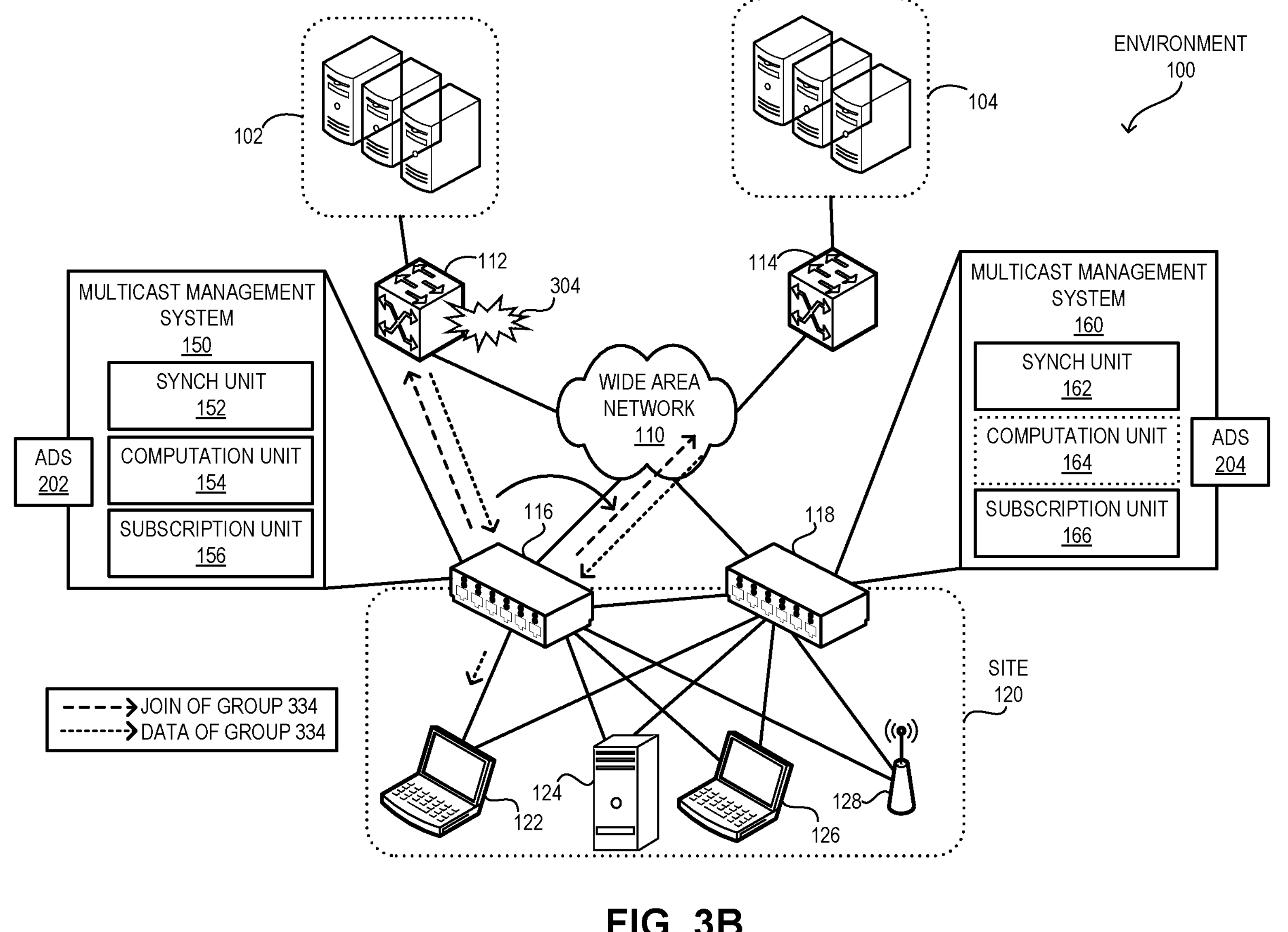
FIG. 3B illustrates an example of a gateway switch facilitating high availability in response to the unavailability of an anchor source, in accordance with an aspect of the present application.

FIG. 3B illustrates an example of a gateway switch facilitating high availability in response to the unavailability of an anchor source, in accordance with an aspect of the present application. For a multicast group 334, switch 116 can be the anchor receiver and datacenter 102 can be the anchor source. Host 122 can be a subscriber of the multicast flow of multicast group 334. Hence, upon receiving the multicast flow from datacenter 102, switch 116 can forward the multicast flow to host 122. Suppose that datacenter 102 becomes unavailable due to an event 304. Event 304 can be at datacenter 102 or switch 112 via which datacenter 102 is reachable. Because of event 304, datacenter 102 may no longer operate as the anchor source for site 120. Switch 116 can detect the unavailability of datacenter 102 based on one or more network protocols (e.g., using a protocol timeout or a keepalive method).

System 150 can then traverse ADS 202 to determine the multicast groups for which datacenter 102 is the anchor source. For example, system 150 can determine from ADS 202 that switch 116 and datacenter 102 are the anchor receiver and the anchor source for multicast group 334. Since the current anchor source is unavailable for multicast group 334, system 150 can then select datacenter 104 as the new anchor source. System 150 can then update ADS 202 to indicate that datacenter 104 is the anchor source. Synchronization unit 152 can send the updated selection information to switch 118. Subscription unit 156 can then send a join request for multicast group 334 to datacenter 104, receive the multicast flow, and forward the multicast flow to host 122.

Figure 4A:
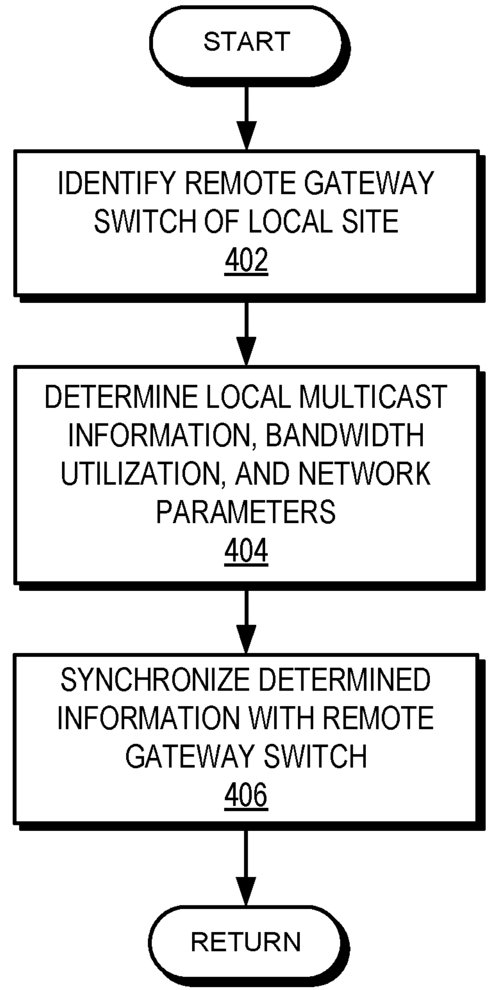
FIG. 4A presents a flowchart illustrating the process of a gateway switch synchronizing multicast information with a remote gateway switch, in accordance with an aspect of the present application.

FIG. 4A presents a flowchart illustrating the process of a gateway switch synchronizing multicast information with a remote gateway switch, in accordance with an aspect of the present application. During operation, the gateway switch can identify the remote gateway switch of the local site (operation 402). The gateway switch can then determine the local multicast information, bandwidth utilization, and network parameters (e.g., health parameters) (operation 404). Subsequently, the gateway switch can synchronize the determined information with the remote gateway switch (operation 406).

Figure 4B:
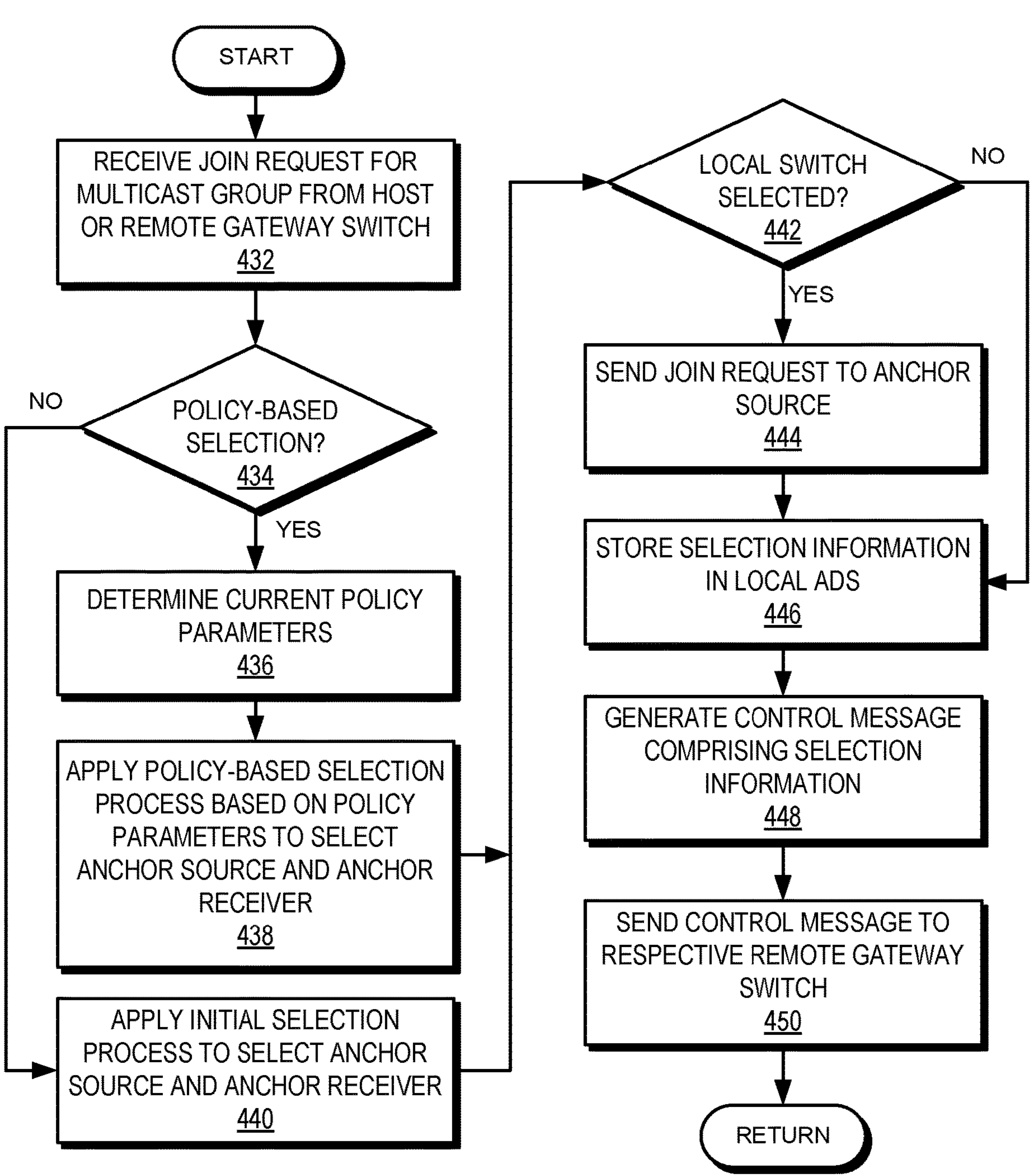
FIG. 4B presents a flowchart illustrating the process of a primary gateway switch determining an anchor source and an anchor receiver for a multicast group, in accordance with an aspect of the present application.

FIG. 4B presents a flowchart illustrating the process of a primary gateway switch determining an anchor source and an anchor receiver for a multicast group, in accordance with an aspect of the present application. During operation, the gateway switch can receive a join request for a multicast group from a host or a remote gateway switch (operation 432). The gateway switch can determine whether the policy-based selection is to be applied (operation 434). If policy-based selection is to be applied, the gateway switch can determine the current policy parameters (operation 436). The gateway switch can then apply the policy-based selection process based on the policy parameters to select the anchor source and anchor receiver (operation 438). On the other hand, if the policy-based selection is not to be applied, the gateway switch can apply the initial selection process (e.g., round-robin selection) to select the anchor source and anchor receiver (operation 440).

The gateway switch can determine whether the local switch is selected as the anchor receiver (operation 442). If the local switch is selected as the anchor receiver, the gateway switch can send a join request to the anchor source (operation 444). If the local switch is not the anchor receiver (operation 442) or upon sending the join request (operation 444), the gateway switch store the selection information in the local ADS (operation 446). The gateway switch can then generate a control message comprising the selection information (operation 448) and send the control message to a respective remote gateway switch (operation 450).

Figure 4C:
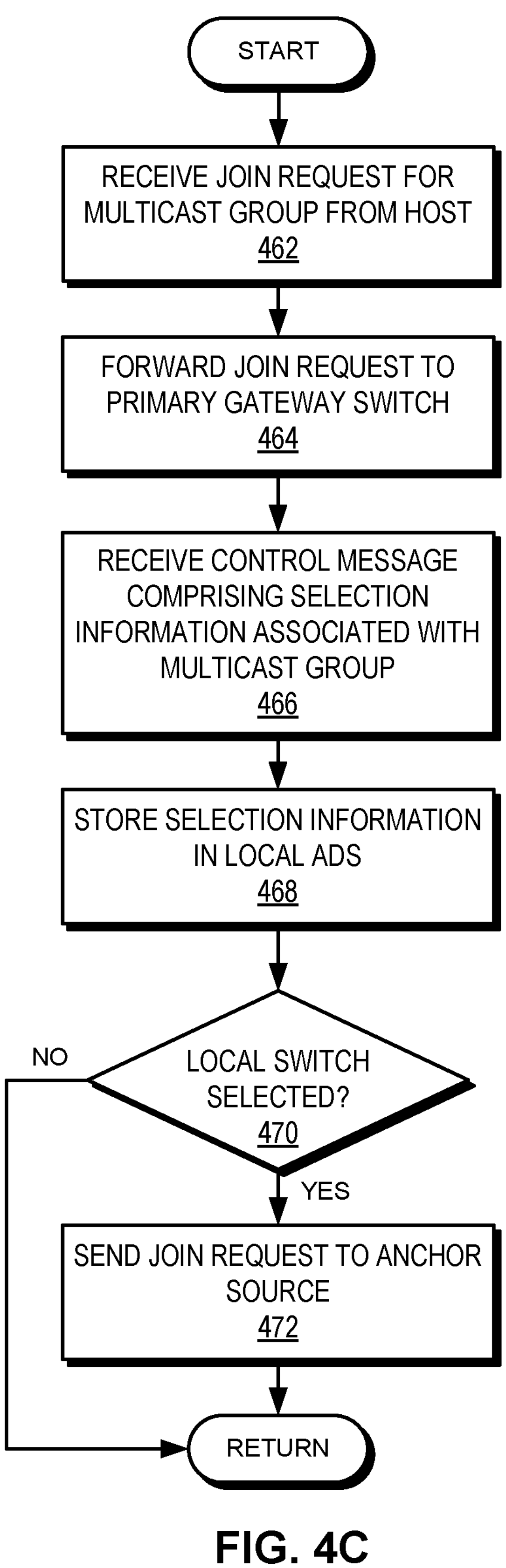
FIG. 4C presents a flowchart illustrating the process of a secondary gateway switch processing a join request for a multicast group, in accordance with an aspect of the present application.

FIG. 4C presents a flowchart illustrating the process of a secondary gateway switch processing a join request for a multicast group, in accordance with an aspect of the present application. During operation, the gateway switch, can receive a join request for a multicast group from a host (operation 462) and forward the join request the primary gateway switch (operation 464). The gateway switch can then receive a control message comprising the selection information associated with the multicast group (operation 466) and store the selection information in the local ADS (operation 468). The gateway switch can also determine whether the local switch is selected as the anchor receiver (operation 470). If the local switch is selected as the anchor receiver, the gateway switch can send a join request to the anchor source (operation 472).

Figure 5A:
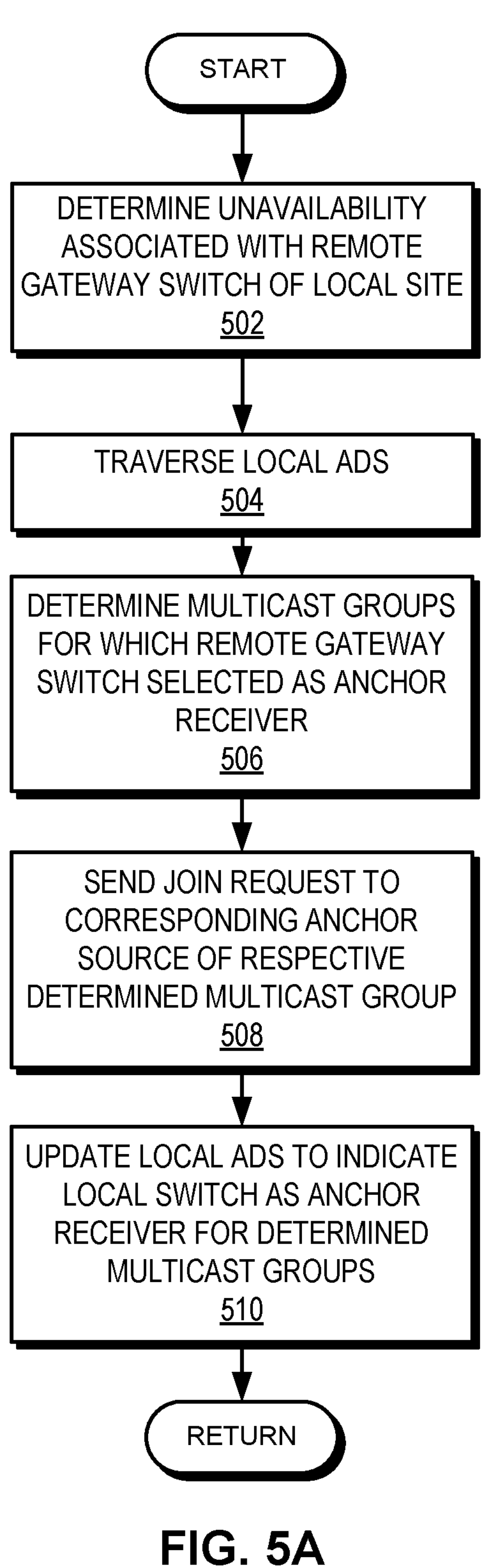
FIG. 5A presents a flowchart illustrating the process of a gateway switch facilitating high availability in response to the unavailability of a remote gateway switch, in accordance with an aspect of the present application.

FIG. 5A presents a flowchart illustrating the process of a gateway switch facilitating high availability in response to the unavailability of a remote gateway switch, in accordance with an aspect of the present application. During operation, the gateway switch can determine unavailability associated with a remote gateway switch of the local site (operation 502). The gateway switch can then traverse the local ADS (operation 504) and determine the multicast groups for which the remote gateway switch is selected as the anchor receiver (operation 506). The gateway switch can then send a join request to a corresponding anchor source (e.g., as indicated in the ADS) of a respective determined multicast group (operation 508). The gateway switch can also update the local ADS to indicate the local switch as the anchor receiver for the determined multicast groups (operation 510).

Figure 5B:
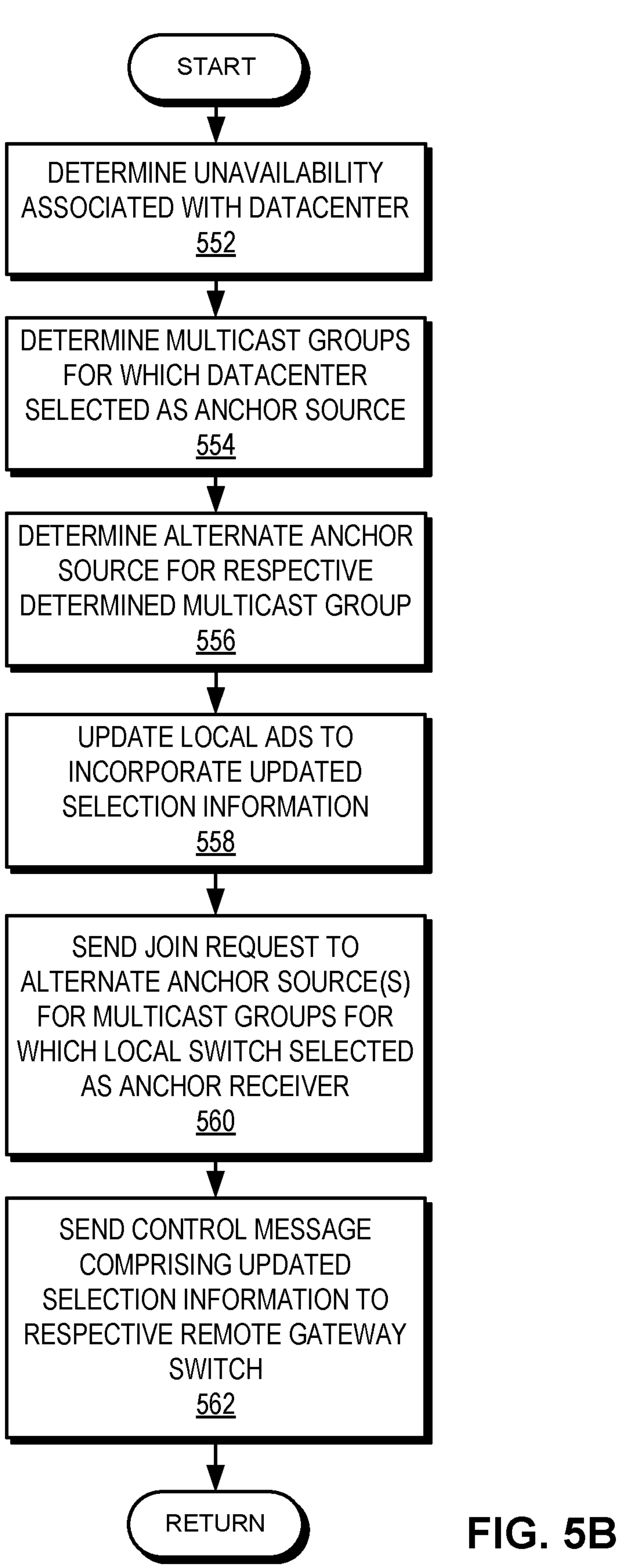
FIG. 5B presents a flowchart illustrating the process of a primary gateway switch facilitating high availability in response to the unavailability of an anchor source, in accordance with an aspect of the present application.

FIG. 5B presents a flowchart illustrating the process of a primary gateway switch facilitating high availability in response to the unavailability of an anchor source, in accordance with an aspect of the present application. During operation, the gateway switch can determine the unavailability associated with a datacenter (operation 552) and determine the multicast groups for which the datacenter is selected as the anchor source (operation 554). The gateway switch can then determine an alternate anchor source a respective determined multicast group (operation 556) and update the local ADS to incorporate the updated selection information (operation 558).

The gateway switch can send a join request to the alternate anchor source(s) for the multicast groups for which the local switch is selected as the anchor receiver (operation 560). The gateway switch can also send a control message comprising the updated selection information to a respective remote gateway switch (operation 560). This allows a respective remote gateway switch to identify the alternate anchor source(s) for the multicast groups for which the remote gateway switch is selected as the anchor receiver. Accordingly, the remote gateway switch can send a join request for those multicast groups.

Figure 6:
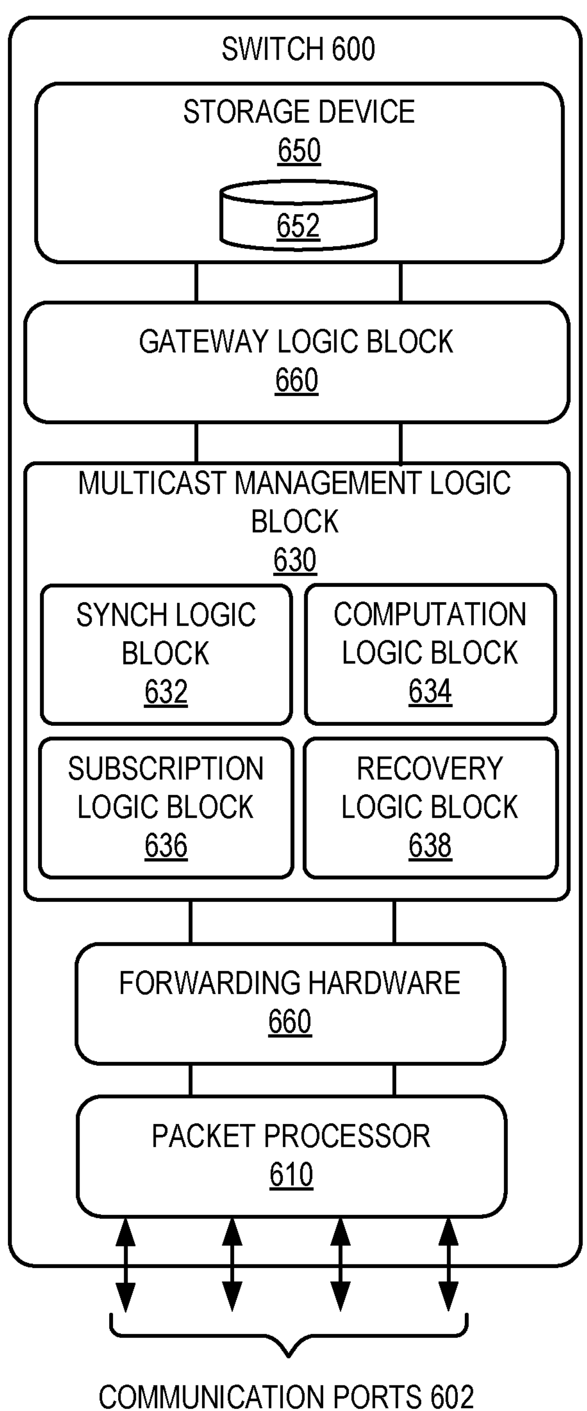
FIG. 6 illustrates an example of a switch supporting the efficient distribution of multicast traffic based on source and receiver anchoring, in accordance with an embodiment of the present application.

FIG. 6 illustrates an example of a switch supporting the efficient distribution of multicast traffic based on source and receiver anchoring, in accordance with an embodiment of the present application. In this example, a switch 600 includes a number of communication ports 602, a packet processor 610, and a storage device 650. Switch 600 can also include forwarding hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet. Switch 600 can include a gateway logic block 640 that allows switch 600 to operate as a gateway switch of a site of an enterprise.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with routing and configuration associated with switch 600. For example, database 652 can maintain a copy of a multicast cache and an ADS instance. Switch 600 can include a multicast management logic block 630 that facilitates the selection of anchors for a respective multicast group. Multicast management logic block 630 can include a synchronization logic block 632, a computation logic block 634, a subscription logic block 636, and a recovery logic block 638.

Synchronization logic block 632 can share the selection information with other gateway switches of the local site. Synchronization logic block 632 can also determine which gateway switch is the primary switch. Furthermore, if switch 600 is not the primary switch, synchronization logic block 632 can send a join request received from a local host and associated information to the primary switch. Computation logic block 634 can determine the anchor source and the anchor receiver for a respective multicast group. Subscription logic block 636 can determine whether switch 600 is selected as an anchor receiver and if selected, can send a join request to the anchor source. Recovery logic block 638 can take over as the anchor source for the multicast groups for which an unavailable gateway switch has previously been selected as the anchor source.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for facilitating efficient multicast traffic distribution in a network comprising a plurality of gateway switches. During operation, the system can receive a join request for a first multicast group. The system can select, based on a source selection mechanism, a first datacenter from a plurality of datacenters as a source of a first multicast flow of the first multicast group. Here, a respective datacenter can provide the first multicast flow. The system can also select, based on a receiver selection mechanism, a first gateway switch from the plurality of gateway switches for receiving the first multicast flow. The system can then send, to the remote gateway switches, a control message comprising information indicating the selection of the source and receiver of the first multicast flow. The control message can notify the first gateway switch to request the first flow from the first datacenter.

In a variation on this aspect, the join request can be received from one of: a host coupled to a port of the gateway switch and a remote gateway switch.

In a further variation, if the join request is received from the remote gateway switch, the system can also receive information indicating multicast subscription, bandwidth utilization, and health parameters associated with the remote gateway switch.

In a variation on this aspect, the system can determine whether the local switch is the first gateway switch. If the local switch is the first gateway switch, the system can send the join request for the first multicast group to the first datacenter.

In a variation on this aspect, a respective selection mechanism can include an initial selection process and a policy-based selection process. Here, the policy-based selection process is applied based on a set of policy parameters.

In a further variation, the system can determine whether to apply the policy-based selection process by comparing a first parameter of the of policy parameters to a threshold. If the first parameter is less than the threshold, the system can apply the initial selection process. On the other hand, if the first parameter reaches the threshold, the system can apply the policy-based selection process.

In a variation on this aspect, upon receiving a subsequent join request for the first multicast group, the system can provide the subsequent join request to the first gateway switch.

In a variation on this aspect, the system can store the information indicating the selection of the source and receiver of the first multicast flow in an entry of in an anchor data structure. The entry can also include a multicast address of the first multicast group.

In a variation on this aspect, upon determining unavailability of the first gateway switch, the system can identify the first datacenter as the source of the first multicast flow of the first multicast group. The system can then send a join request for the first multicast group to the first datacenter.

In a variation on this aspect, upon receiving a second join request for a second multicast group, the system can select, based on the receiver selection mechanism, a second datacenter from the plurality of datacenters as a source of a second multicast flow of the second multicast group. The system can also select, based on the receiver selection mechanism, a second gateway switch from the plurality of gateway switches for receiving the second multicast flow.

The data structures and code described in this detailed description are typically stored on a computer-readable storage medium, which may be any device or medium that can store code and/or data for use by a computer system. The computer-readable storage medium includes, but is not limited to, flip/flops, latches, registers, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by a given gateway switch of a network, a join request for a first multicast group, wherein the network comprises a plurality of gateway switches that include the given gateway switch;

selecting, by the given gateway switch based on a source selection mechanism, a first datacenter from a plurality of datacenters as a source of a first multicast flow of the first multicast group, wherein the selected datacenter is to provide the first multicast flow to a receiver;

selecting, by the given gateway switch based on a receiver selection mechanism, a first gateway switch from the plurality of gateway switches in the network as the receiver to receive the first multicast flow; and sending, by the given gateway switch to the first gateway switch, a control message comprising information indicating the selection of the source of the first multicast flow and the receiver of the first multicast flow, wherein the control message notifies the first gateway switch to request the first multicast flow from the first datacenter.

2. The method of claim 1, wherein the join request is received from one of:

a host coupled to a port of the given gateway switch; and a remote gateway switch.

3. The method of claim 2, wherein, in response to the join request being received from the remote gateway switch, the method further comprises receiving, at the given gateway switch with the join request, information indicating multicast subscription, bandwidth utilization, and health parameters associated with the remote gateway switch.

4. The method of claim 1, wherein at least one of the source selection mechanism and the receiver selection mechanism includes an initial selection process and a policy-based selection process, wherein the policy-based selection process is applied based on a set of policy parameters.

5. The method of claim 4, further comprising:

determining whether to apply the policy-based selection process by comparing a first parameter of the of policy parameters to a threshold;

in response to the first parameter being less than the threshold, applying the initial selection process; and in response to the first parameter reaching the threshold, applying the policy-based selection process.

6. The method of claim 1, wherein, in response to receiving a subsequent join request for the first multicast group, the method further comprises providing the subsequent join request to the first gateway switch.

7. The method of claim 1, further comprising storing, by the given gateway switch, the information indicating the selection of the source and receiver of the first multicast flow in an entry of in an anchor data structure, wherein the entry further comprises a multicast address of the first multicast group.

8. The method of claim 1, wherein, in response to determining unavailability of the first gateway switch, the method further comprises:

identifying the first datacenter as the source of the first multicast flow of the first multicast group; and sending, by the given gateway switch, a join request for the first multicast group to the first datacenter.

9. The method of claim 1, wherein, in response to receiving a second join request for a second multicast group, the method further comprises:

selecting, by the given gateway switch based on the receiver selection mechanism, a second datacenter from the plurality of datacenters as a source of a second multicast flow of the second multicast group; and selecting, by the given gateway switch based on the receiver selection mechanism, a second gateway switch from the plurality of gateway switches for receiving the second multicast flow.

10. A non-transitory computer-readable storage medium storing instructions that when executed by a given gateway switch of a network cause the given gateway switch to perform a method, the method comprising:

receiving a join request for a first multicast group, wherein the network comprises a plurality of gateway switches that include the given gateway switch;

selecting, based on a source selection mechanism, a first datacenter from a plurality of datacenters as a source of a first multicast flow of the first multicast group, wherein the selected datacenter is to provide the first multicast flow to a receiver;

selecting, based on a receiver selection mechanism, a first gateway switch from the plurality of gateway switches in the network as the receiver to receive the first multicast flow; and sending, to the first gateway switch of the plurality of gateway switches, a control message comprising information indicating the selection of the source of the first multicast flow and the receiver of the first multicast flow, wherein the control message notifies the first gateway switch to request the first multicast flow from the first datacenter.

11. The non-transitory computer-readable storage medium of claim 10, wherein the join request is received from one of:

a host coupled to a port of the given gateway switch; and a remote gateway switch.

12. The non-transitory computer-readable storage medium of claim 11, wherein, in response to the join request being received from the remote gateway switch, the method further comprises receiving, at the gateway switch with the join request, information indicating multicast subscription, bandwidth utilization, and health parameters associated with the remote gateway switch.

13. The non-transitory computer-readable storage medium of claim 10, wherein at least one of the source selection mechanism and the receiver selection mechanism includes an initial selection process and a policy-based selection process, wherein the policy-based selection process is applied based on a set of policy parameters.

14. The non-transitory computer-readable storage medium of claim 13, wherein the method further comprises:

determining whether to apply the policy-based selection process by comparing a first parameter of the of policy parameters to a threshold;

in response to the first parameter being less than the threshold, applying the initial selection process; and in response to the first parameter reaching the threshold, applying the policy-based selection process.

15. The non-transitory computer-readable storage medium of claim 10, wherein, in response to receiving a subsequent join request for the first multicast group, the method further comprises providing the subsequent join request to the first gateway switch.

16. The non-transitory computer-readable storage medium of claim 10, wherein the method further comprises storing the information indicating the selection of the source and receiver of the first multicast flow in an entry of in an anchor data structure, wherein the entry further comprises a multicast address of the first multicast group.

17. The non-transitory computer-readable storage medium of claim 10, wherein, in response to determining unavailability of the first gateway switch, the method further comprises:

identifying the first datacenter as the source of the first multicast flow of the first multicast group; and sending, by the given gateway switch, a join request for the first multicast group to the first datacenter.

18. A computer system, comprising:

processing circuitry;

forwarding hardware;

a gateway logic block to operate the computer system as a given gateway switch of a network, wherein the network includes a plurality of gateway switches;

a packet processor to receive a join request for a first multicast group, wherein the network comprises a plurality of gateway switches that include the given gateway switch;

a multicast management logic block to:

select, based on a source selection mechanism, a first datacenter from a plurality of datacenters as a source of a first multicast flow of the first multicast group, wherein the selected datacenter is to provide the first multicast flow to a receiver; and select, based on a receiver selection mechanism, a first gateway switch from the plurality of gateway switches in the network as the receiver to receive the first multicast flow; and send, to the first gateway switch of the plurality of gateway switches, a control message comprising information indicating the selection of the source of the first multicast flow and the receiver of the first multicast flow, wherein the control message notifies the first gateway switch to request the first multicast flow from the first datacenter.

19. The computer system of claim 18, wherein at least one of the source selection mechanism and the receiver selection mechanism includes an initial selection process and a policy-based selection process, wherein the policy-based selection process is applied based on a set of policy parameters.

20. The computer system of claim 19, wherein the multicast management logic block is further to:

Determine whether to apply the policy-based selection process by comparing a first parameter of the of policy parameters to a threshold;

in response to the first parameter being less than the threshold, apply the initial selection process; and in response to the first parameter reaching the threshold, apply the policy-based selection process.

* * * * *